US012348406B2

(12) United States Patent
Bedouet

(10) Patent No.: US 12,348,406 B2
(45) Date of Patent: Jul. 1, 2025

(54) METHOD AND SYSTEM OF MONITORING BGP-eVpn MESSAGES SENT OVER A MESH BETWEEN A POINT OF PRESENCE AND A DATACENTER

(71) Applicant: OVH, Roubaix (FR)

(72) Inventor: Olivier Jacques Henri Bedouet, Malissard (FR)

(73) Assignee: OVH, Roubaix (FR)

( * ) Notice: Subject to any disclaimer, the term of this patent is extended or adjusted under 35 U.S.C. 154(b) by 372 days.

(21) Appl. No.: 17/951,038

(22) Filed: Sep. 22, 2022

(65) Prior Publication Data
US 2023/0095540 A1    Mar. 30, 2023

(30) Foreign Application Priority Data
Sep. 30, 2021    (EP) .................................. 21306363

(51) Int. Cl.
*H04L 12/66*        (2006.01)
*H04L 45/02*        (2022.01)

(52) U.S. Cl.
CPC .................................. *H04L 45/04* (2013.01)

(58) Field of Classification Search
CPC ............... H04L 65/1069; H04L 65/104; H04L 65/1016; H04L 65/1053; H04L 65/1104; H04L 65/1023; H04L 65/00; H04L 65/11; H04L 67/10; H04L 65/102; H04L 67/56; H04L 67/14; H04L 65/1046; H04M 7/006; H04M 3/42068; H04M 15/57; H04M 15/63; H04M 2215/208; H04M 7/1245

See application file for complete search history.

(56) References Cited

U.S. PATENT DOCUMENTS

| 8,693,323 | B1 * | 4/2014 | McDysan ............... H04L 47/10 370/392 |
| 10,298,698 | B2 * | 5/2019 | Kapadia .................. H04L 67/52 |
| 10,404,573 | B2 * | 9/2019 | Ammireddy ........ H04L 12/1854 |
| 10,623,300 | B2 | 4/2020 | Ammireddy et al. |
| 10,917,331 | B1 * | 2/2021 | Zaki ........................ H04L 45/34 |
| 10,917,340 | B2 * | 2/2021 | Gandhi ............... H04L 43/0835 |

(Continued)

OTHER PUBLICATIONS

Extended European Search Report with regard to the EP Patent Application No. 21306363.9 completed on Feb. 24, 2022.

(Continued)

*Primary Examiner* — Kharye Pope
(74) *Attorney, Agent, or Firm* — BCF LLP

(57) ABSTRACT

A method and system of monitoring BGP-eVpn messages sent over a Mesh between a Point of Presence, POP, and a datacenter managed by an infrastructure provider in an Infrastructure provider network, including (i) receiving a BGP-eVpn message, at a Deployed network monitor connected to the Mesh, (ii) parsing by the Deployed network monitor the received BGP-eVpn message into Destination-type fields; and (iii) updating by the Deployed network monitor a Database representative of a per-tenant historical view of BGP-eVpn updates for a network deployed by or for a customer of the infrastructure provider in the Infrastructure provider network, based on a correlation between one or more of the parsed Destination-type fields and existing values in the Database entries.

13 Claims, 6 Drawing Sheets

(56) References Cited

U.S. PATENT DOCUMENTS

2018/0309596 A1* 10/2018 Brissette ............ H04L 12/4679

OTHER PUBLICATIONS

"A Network Virtualization Overlay Solution Using Ethernet VPN (EVPN)" retrieved on https://datatracker.ietf.org/doc/html/rfc8365 on Sep. 21, 2022, pp. 1-33.
Di Battista et al., "Monitoring the Status of MPLS VPN and VPLS Based on BGP Signaling Information", Università Degli Studi Roma Tre, 2012, http://www.dia.uniroma3.it/~rimondin/publications/uploads/VPLS_Monitoring.pdf, 270 pages.
Orsini et al., "BGPStream: A Software Framework for Live and Historical BGP Data Analysis", 2016, https://dl.acm.org/doi/pdf/10.1145/2987443.2987482, 16 pages.

* cited by examiner

METHOD AND SYSTEM OF MONITORING BGP-eVpn MESSAGES SENT OVER A MESH BETWEEN A POINT OF PRESENCE AND A DATACENTER

CROSS-REFERENCE

The present application claims priority to European Patent Convention Application No. 21306363.9, entitled "Method and System of Monitoring BGP-EVPN Messages Sent Over a Mesh Between a Point of Presence and a Datacenter," filed on Sep. 30, 2021, the entirety of which is incorporated by reference herein.

FIELD

The present technology relates to information technology, more particularly to a method and system of monitoring BGP-eVpn messages sent over a mesh between a Point Of Presence and a datacenter, with a view of providing routing information base for a selected tenant.

BACKGROUND

Today, connectivity of a customer's network to an infrastructure provider's datacenter is at the core of the cloud-related business. "Datacenter" as used herein, is not limited to the infrastructure located within physical boundaries of one server farm, but rather comprises all infrastructure, whether local or remote, that an infrastructure provider deploys, controls and maintains to provide services based on computer clustering, to its own internal services, or to third party entities, altogether clients of the infrastructure provider.

There is a need for providing with efficiency to both the customer and the infrastructure provider, routing information base for a selected tenant of the network deployed by or for the customer in the infrastructure provider's datacenter. Both the customer and the infrastructure provider may indeed need that information for proper operation, maintenance and evolution of the customer's deployed network. "Efficiency" in that context points to one or several of:
  information that is collected by the infrastructure provider without querying endpoints (physical or virtual devices connected to the deployed network);
  collected information about the customer deployed network that is analyzed (for example correlating events in the collected information with existing entries in a database) and converted by the infrastructure provider into a format that may be exploited by both the customer and the infrastructure provider;
  analyzed and converted information that is provided by the infrastructure provider to the customer on a per-tenant basis; and
  analyzed and converted information that is centrally recorded by the infrastructure provider so as to enable both an instant view of the customer deployed network, and a historical log of statuses and events.

Various attempts have been made at tackling wholly or in part this quest for efficiency by infrastructure providers. However, these attempts have failed to contain the problem in particular as it relates to not querying endpoints of a network deployed by or for the customer.

Generally speaking, the present technology aims at monitoring BGP-eVpn messages between a Point of Presence, POP, and the datacenter, and centrally generating a per-tenant historical log of BGP-eVpn updates in relation to a network deployed by or for a customer.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In embodiments, various implementations of the present technology provide a method of monitoring BGP-eVpn messages sent over a Mesh between a Point Of Presence, POP, and a datacenter managed by an infrastructure provider in an Infrastructure provider network, comprising:
  receiving a BGP-eVpn message, at a Deployed network monitor connected to the Mesh;
  parsing by the Deployed network monitor the received BGP-eVpn message into Destination-type fields; and
  updating by the Deployed network monitor a Database representative of a per-tenant historical view of BGP-eVpn updates for a network deployed by or for a customer of the infrastructure provider in the Infrastructure provider network, based on a correlation between one or more of the parsed Destination-type fields and existing values in the Database entries.

In embodiments, the method further comprises:
  creating the Database by associating to each entry selected of Destination-type fields, a field representative of the time of receipt of the sent BGP-eVpn message, Timestamp field, and a field representative of the active/inactive status of the entry, Status field; and
  querying, by the Deployed network monitor the Database:
    if there is no existing entry in the Database with values in all the selected Destination-type fields identical to values of corresponding of the parsed Destination-type fields of the received BGP-eVpn message:
      adding an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field;
    otherwise: adding an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and editing any other existing entry in the Database with values in all the selected Destination-type fields identical to values of corresponding of the parsed Destination-type fields of the received BGP-eVpn message, by setting an inactive status in the Status field.

In embodiments, the method further includes:
  parsing by the Deployed network monitor the received BGP-eVpn message into Attribute-type fields, and wherein:

the creating the Database further comprises associating to each entry selected of the parsed Attribute-type fields;

if there is no existing entry in the Database with values in all the selected Destination-type fields identical to values of corresponding of the parsed Destination-type fields of the received BGP-eVpn message: the adding an entry in the Database is further with values in the selected Attribute-type fields set at values of corresponding of the parsed Attribute-type fields of the received BGP-eVpn message; and otherwise: the adding an entry in the Database is further with values in the selected Attribute-type fields set at values of corresponding of the parsed Attribute-type fields of the received BGP-eVpn message.

In embodiments of the method, the Destination-type fields comprise the field IP.

In embodiments of the method, the Destination-type fields comprise the field MAC address.

In embodiments of the method, the Attribute-type fields comprise at least one of the fields AS-path, Med, Localpref, RD, or Nexthop.

In embodiments, the method further comprises using the per-tenant historical view of BGP-eVpn updates to infer a routing information base for a selected tenant of the network deployed by or for the customer, and providing to the customer by the infrastructure provider the inferred routing information base for the selected tenant.

In embodiments, various implementations of the present technology provide a system for monitoring BGP-eVpn messages sent over a Mesh between a point of presence, POP, and a datacenter managed by an infrastructure provider in an Infrastructure provider network, comprising a Deployed network monitor connected to the Mesh, and configured to:

receive a BGP-eVpn message sent over the Mesh;

parse the received BGP-eVpn message into Destination-type fields; and update a Database representative of a per-tenant historical view of BGP-eVpn updates for a network deployed by or for a customer of the infrastructure provider in the Infrastructure provider network, based on a correlation between one or more of the parsed Destination-type fields and existing values in the Database entries.

In embodiments, the system is further configured to create the Database by associating to each entry selected of Destination-type fields, a field representative of the time of receipt of the sent BGP-eVpn message, Timestamp field, and a field representative of the active/inactive status of the entry, Status field; and wherein the Deployed network monitor is further configured to query the Database, and to:

if there is no existing entry in the Database with values in all the selected Destination-type fields identical to values of corresponding of the parsed Destination-type fields of the received BGP-eVpn message: add an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field;

otherwise: add an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and edit any other existing entry in the Database with values in all the selected Destination-type fields identical to values of corresponding of the parsed Destination-type fields of the received BGP-eVpn message, by setting an inactive status in the Status field.

In embodiments, the system is further configured to create the Database by further associating to each entry selected of Attribute-type fields; and wherein the Deployed network monitor is further configured to:

parse the received BGP-eVpn message into Attribute-type fields; and query the Database, and to:

if there is no existing entry in the Database with values in all the selected Destination-type fields identical to values of corresponding of the parsed Destination-type fields of the received BGP-eVpn message: execute further the adding an entry in the Database with values in the selected Attribute-type fields set at values of corresponding of the parsed Attribute-type fields of the received BGP-eVpn message; and otherwise: execute further the adding an entry in the Database with values in the selected Attribute-type fields set at values of corresponding of the parsed Attribute-type fields of the received BGP-eVpn message.

In embodiments of the system, the Destination-type fields comprise the field IP.

In embodiments of the system, the Destination-type fields comprise the field MAC address.

In embodiments of the system, the Attribute-type fields comprise at least one of the fields AS-path, Med, Localpref, RD, or Nexthop.

In embodiments, the system is further configured to use the per-tenant historical view of BGP-eVpn updates to infer a routing information base for a selected tenant of the network deployed by or for the customer, and to provide to the customer by the infrastructure provider the inferred routing information base for the selected tenant.

Various implementations of the present technology also provide a computer-readable medium comprising instructions causing a computing system to perform the above method.

In the context of the present description, unless expressly provided otherwise, a system, may refer, but is not limited to, an "electronic device", an "operation system", a "computing system", a "computer-based system", a "controller unit", a "monitoring device", a "control device" and/or any combination thereof appropriate to the relevant task at hand.

In the context of the present description, the functional steps shown in the figures, may be provided through use of dedicated hardware, as well as hardware capable of executing software in association with appropriate software. Further, the functions of the various functional blocks shown in the figures, such as labeled «network device», «tool», «configurator», etc. may be provided through the use of dedicated hardware as well as hardware capable of executing software in association with appropriate software. When provided by a "processor", the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). In the aforementioned, explicit use of the term a «processor should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Still in the context of the present description, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

Still in the context of the present description, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

It should be noted that, unless otherwise explicitly specified herein, the drawings are not to scale. Further, elements that are identical from one figure to the next share the same reference numerals.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Figure 1:
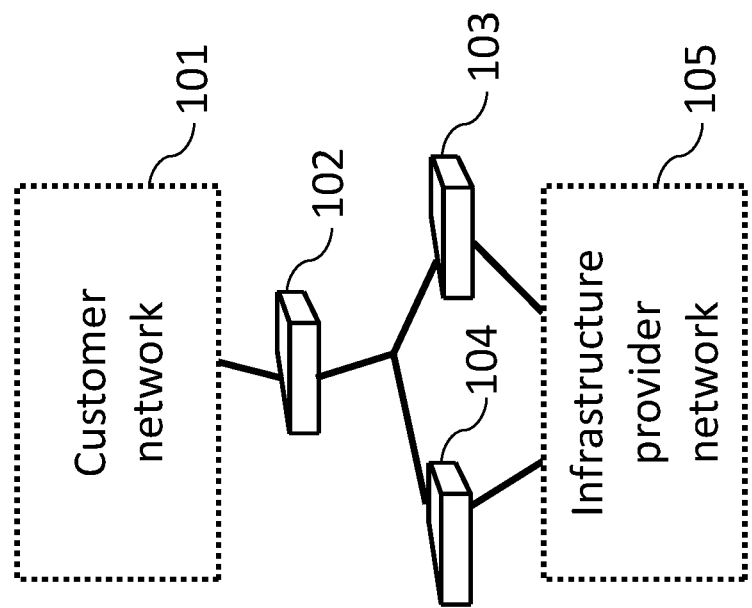
FIG. 1 depicts a datacenter environment in which the present technology may be used.

FIG. 1 depicts a datacenter environment in which the present technology may be used. A customer may operate a Customer network 101. Customer network 101 may be connected to a customer switch/router 102. Two physical connections may connect customer switch/router 102 to respectively provider switch/routers 103 and 104. Such connections may be configured by the customer in aggregate mode, for example using Link Aggregation Control Protocol (LACP), and/or on each of such connections a Border Gateway Protocol (BGP) session may be established. Provider router/switches 103 and 104 constitute a POP for, and connect to, an Infrastructure provider network 105. Infrastructure provider network 105 may be operated by an infrastructure provider, and may for example be providing virtual resources dedicated to a network deployed by or for the customer. Infrastructure provider network 105 may for example, physically reside in at least one of infrastructure provider's datacenters.

Figure 2:
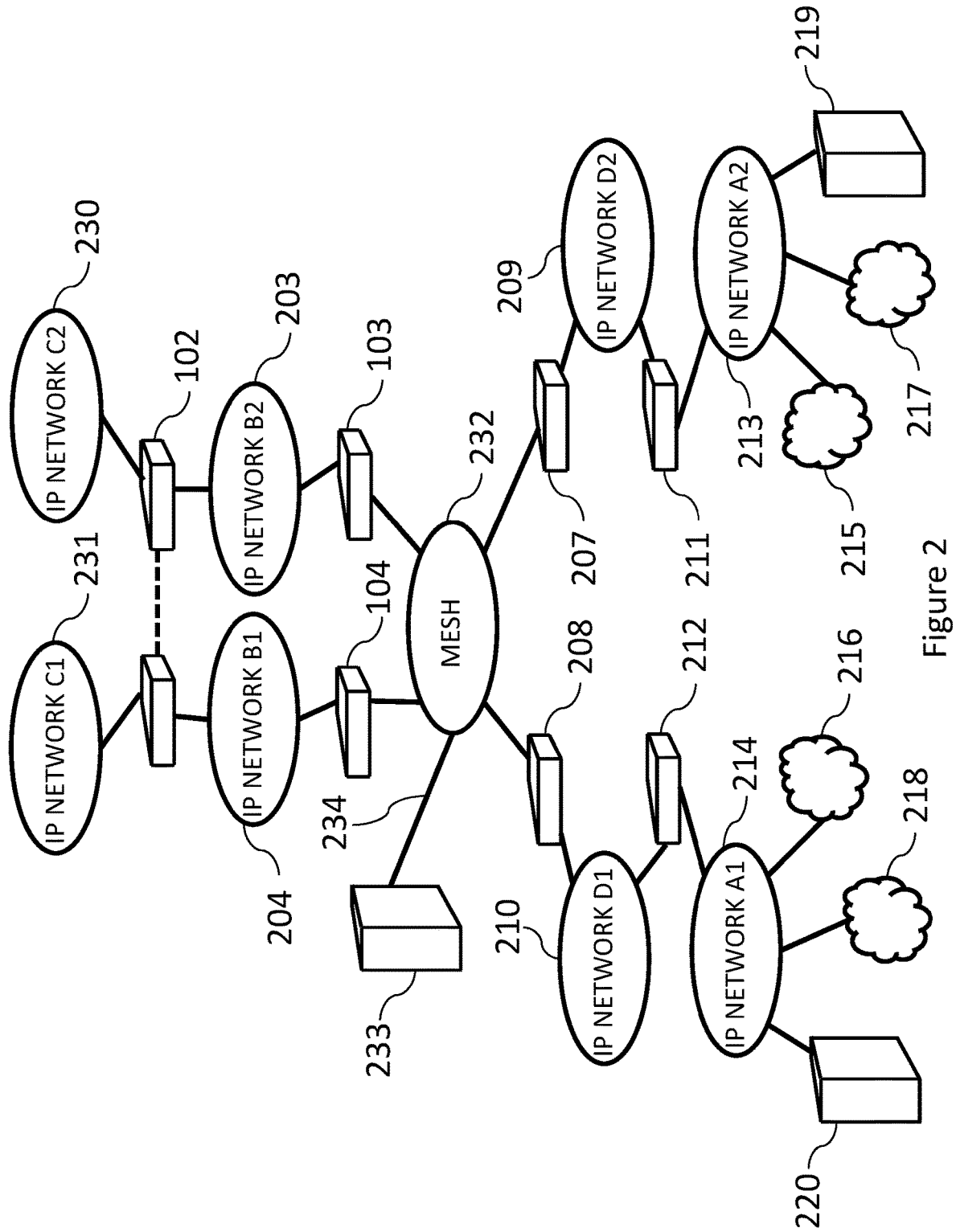
FIG. 2 presents a logical view of an exemplary configuration of a network deployed by or for the customer in the datacenter environment of FIG. 1.

FIG. 2 presents a logical view of an exemplary configuration of a network deployed by or for the customer in the datacenter environment of FIG. 1. Customer may operate an IP Network C1 231, for example over customer network 101. Customer router 102 may be connected to IP Network C1 231 through a Layer 3 connection. Customer may operate an IP Network C2 230, for example over customer network 101. Customer router 102 may be connected to IP Network C2 230 through a Layer 3 connection. Each of such two L3 connections may be routed by customer router 102 to respectively IP Network B1 204 and IP Network B2 203. Provider router 104 may be BGP peered with customer router 102, and connect IP Network B1 204 to a Mesh 232. Provider router 103 may be BGP peered with customer router 102, and connect IP Network B2 203 to Mesh 232. Provider routers 103 and 104 may be considered POPs for the provider network 105.

To the Mesh 232 may also be connected respectively provider routers 208 and 207. Provider router 208 may be connected to IP Network D1 210 through a Layer 3 connection. A provider router 212 may also be connected to IP Network D1 210, be BGP peered with provider router 208, and be connecting IP Network D1 210 to IP Network A1 214. To IP Network A1 214 may also be connected (for example) a private cloud 218, a public cloud 216 and a Software Defined Networking (SDN) component 220.

Provider router 207 may be connected to IP Network D2 209 through a Layer 3 connection. A provider router 211 may also be connected to IP Network D2 209, be BGP peered with provider router 207, and be connecting IP Network D2 209 to IP Network A2 213. To IP Network A2 213 may also be connected (for example) a private cloud 217, public cloud 215 and a SDN component 219.

A Deployed network monitor 233 may be connected to the Mesh 232 through a Connection 234. As seen below, the Deployed network monitor 233 may provide to either or both the customer and the infrastructure provider, information about the routing information base for the network deployed by or for the customer in the datacenter, in particular as it relates to virtual resources of Infrastructure provider network 105 dedicated to the customer.

Figure 3:
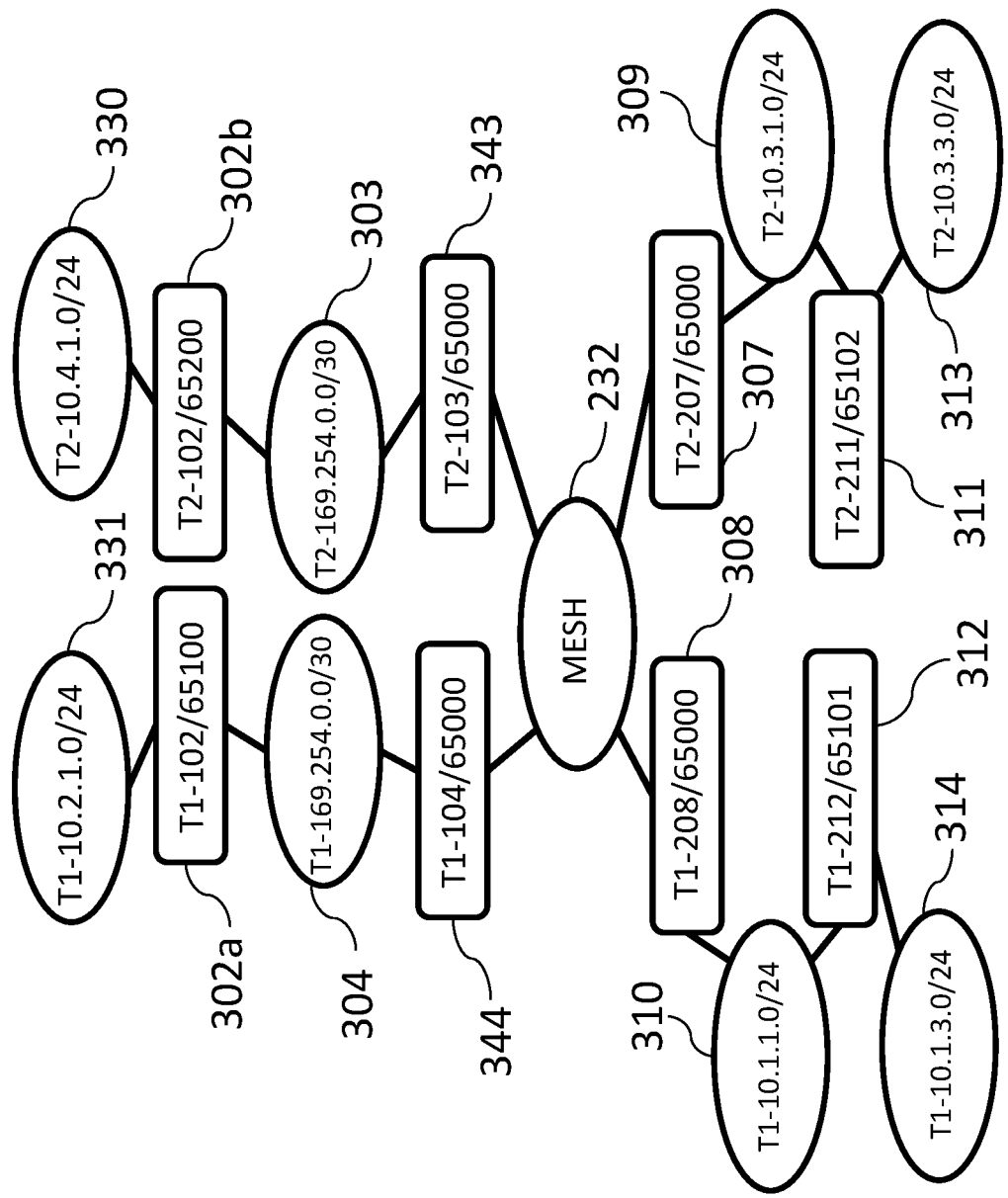
FIG. 3 presents hypothetical values of addresses for networks and routers corresponding to the exemplary logical view as in FIG. 2 of a configuration of a network deployed by or for the customer in the datacenter environment of FIG. 1.

FIG. 3 presents hypothetical values of addresses for networks and routers corresponding to the exemplary logical view as in FIG. 2 of a configuration of a network deployed by or for the customer in the datacenter environment of FIG. 1. A multi-tenant scenario is depicted, with for example two tenants which are identified by respectively "T1" and "T2" in the address hypothetical values.

Around the Mesh 232, the four routers 104, 208, 103 and 207 (FIG. 2) all have respectively hypothetical BGP-eVpn prefixes T1-104/66000 (344), T1-208/66000 (308), T2-103/66000 (343) and T2-207/66000, as peers in the autonomous system ("AS") 66000.

Outside of that AS:
the eight networks 231, 204, 210, 214, 230, 230, 203, 209 and 213 (FIG. 2) have respectively hypothetical IPv4 prefixes T1-10.2.1.0/24 (331), T1-169.254.0.0/30 (304), T1-10.1.1.0/24 (310), T1-10.1.3.0/24 (314), T2-10.4.1.0/24 (330), T2-169.254.0.0/30 (303), T2-10.3.1.0/24 (309) and T2-10.3.3.0/24 (313);
the three routers 102, 212 and 211 (FIG. 2) have respectively hypothetical IPv4 prefixes T1-102/65100 (302a) and T2-102/65200 (302b) for router 102, and T1-212/65101 (312) and T2-211/65102 (311) for the other two routers, defining several other AS 65100, 65200, 65101 and 65102.

The Deployed network monitor 233 connected to the Mesh 232 (FIG. 2) may receive all BGP Update messages exchanged between BGP peers. Optionally it may also receive all BGP Notification messages exchanged between BGP peers.

The Deployed network monitor 233 may collect this information of sent messages which is representative of the per-tenant routing information base for the network deployed by or for the customer in the datacenter environment of the infrastructure provider. Such information may be analyzed (for example correlating events in the collected information with existing entries in a database) and converted by the Deployed network monitor 233 into a format that may be exploited by both the customer and the infrastructure provider.

For example, the analyzed and converted information may be centrally recorded by the Deployed network monitor 233 under the form of a database of records, such as for example in Table 1:

TABLE 1

| Status | Tenant (RD) | Timestamp | Prefix (IP) | Nexthop | Med | Localpref | AS-path |
| --- | --- | --- | --- | --- | --- | --- | --- |
| Active | T1 | 2021-08-05 09:21:34.63 | 169.254.0.0/30 | 104 | 0 | 100 | {65000} |
| Active | T2 | 2021-08-05 09:21:34.77 | 169.254.0.0/30 | 103 | 0 | 100 | {65000} |
| Active | T1 | 2021-08-05 09:21:40.18 | 10.2.1.0/24 | 104 | 0 | 100 | {65000, 65100} |
| Active | T2 | 2021-08-05 09:21:40.22 | 10.4.1.0/24 | 103 | 0 | 100 | {65000, 65200} |
| Active | T1 | 2021-08-05 09:21:40.23 | 10.1.1.0/24 | 208 | 0 | 100 | {65000} |
| Active | T1 | 2021-08-05 09:21:40.56 | 10.1.3.0/24 | 208 | 0 | 100 | {65000, 65101} |
| Active | T2 | 2021-08-05 09:21:40.79 | 10.3.1.0/24 | 207 | 0 | 100 | {65000} |
| Active | T2 | 2021-08-05 09:21:42.02 | 10.3.3.0/24 | 207 | 0 | 100 | {65000, 65102} |

Each received BGP-eVpn message, except in the circumstances indicated below, may translate into a new database entry (here: a row in the Table 1), recording at least "Destination-type" fields from the message, and optionally "Attribute-type" fields.

Destination-type fields, as used herein, comprise, by reference to RFC8365 of Internet Engineering Task Force (see for instance https://datatracker.ietf.org/doc/html/rfc8365), the fields IP and IP Length. They may comprise more generally message fields whose value participates in the BGP routing decision making. For example, while the above examples and scenario have been provided in relation to Layer 3 routing, it will be apparent to the person skilled in the art that given the current and evolving nature of the BGP-eVpn standards, the same principles, and the present technology, including as generalized below, may apply to other routing protocols, such as, without limitation, Layer 2, and thus Destination-type fields also comprise MAC (address) fields. Destination-type fields may be considered unique elements that may be used in a correlation operation between events as advertised by n BGP-eVpn messages, and events stored in a database.

As indicated, other BGP-eVpn message fields, as Attribute-type fields, may optionally be used in the present technology. Attribute-type fields, as used herein, comprise, by reference to the RFC8365, part or all of the fields AS-path, Med, Localpref, RD (or Route Distinguisher, or Tenant), and Nexthop. More generally, Attribute-type fields may comprise non-unique elements associated with Destination-type fields.

A "Timestamp" is associated with each database entry, which is representative of the time of receipt of the BGP-eVpn message. A "Status" is also associated with each database entry, as described below. A received BGP-eVpn message may not translate into new a database entry when all the values in the Destination-type fields of the message, and as the case may be, in the Attribute-type fields of the message, match the values in an existing entry of the database.

The database records illustrated in Table 1 correspond to BGP Update messages advertising routes between BGP peers. However, BGP Update messages may also be used to update or withdraw routes between BGP peers. Conversely, BGP Notification messages may be used to advertise an error in a BGP connection, which should be closed. Thus, the Deployed network monitor 233, upon receiving a BGP-eVpn message, may correlate the information in the received message with the information already present in the database, before further updating the database as the case may be.

For example, assuming the information in Table 1, and the Deployed network monitor 233 subsequently receives a BGP Update message with a value of "10" in the Med field, in the route to the network with a prefix T1-169.254.0.0/30 through the router 103 in Tenant T2, then both:

the existing record for that route in the database is set to an "Inactive status"; and a new entry is recorded in the database for that route, with an "Active" status.

In that illustrative scenario, the information in Table 1 is updated by the Deployed network monitor 233 as in Table 2:

by or for a customer of the infrastructure provider in the Infrastructure provider network 105, based on a correlation between the values in one or more of the parsed Destination-type fields, with existing values in corresponding of the database entries.

Figure 5:
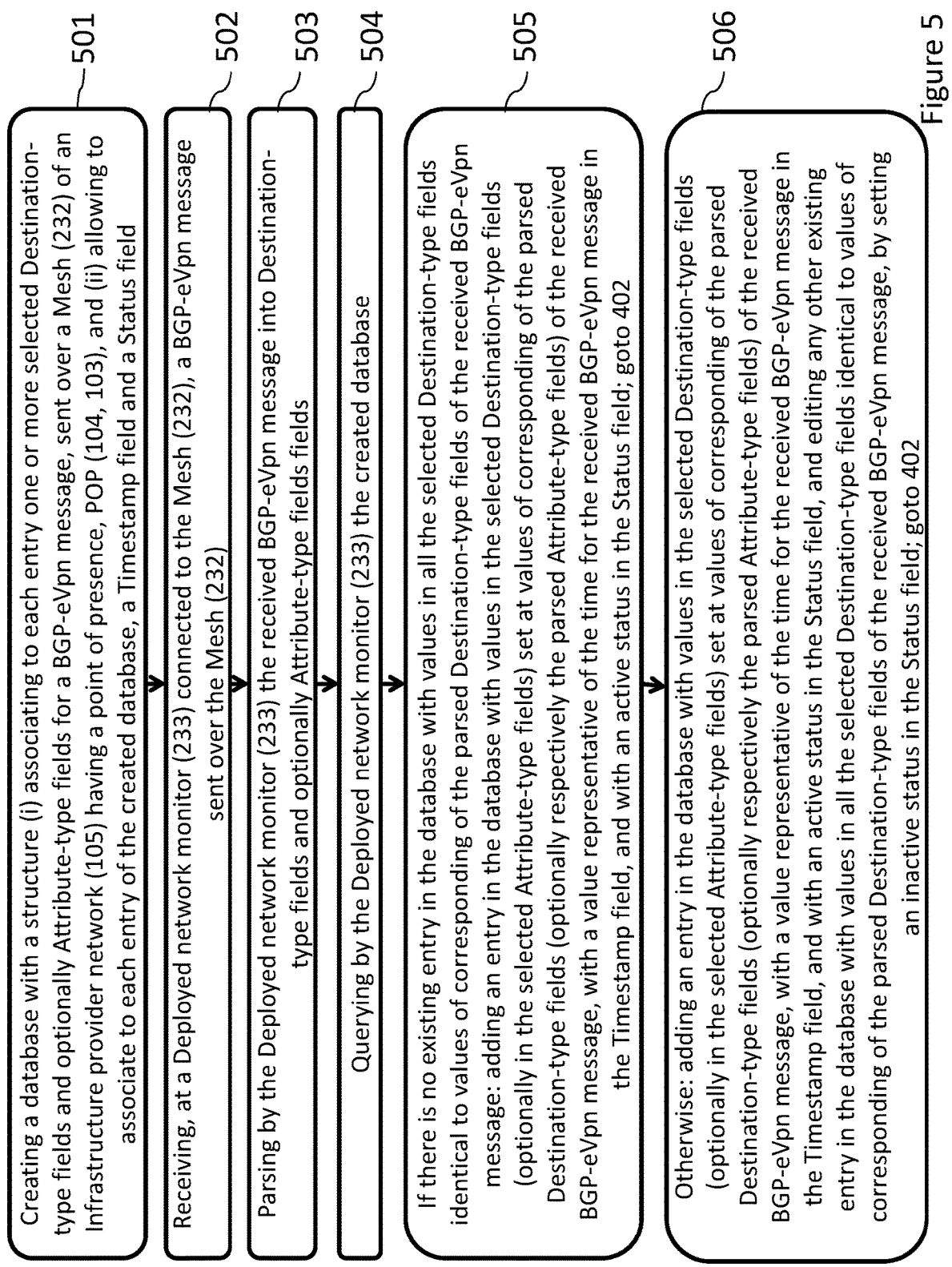
FIG. 5 presents a process in particular embodiments of the present technology.

In embodiments of the present technology, the process described in relation to FIG. 5 may further be applied:

at step 501: a database may be created (for example, but not necessarily, by the Deployed network monitor 233) with a structure (ex: record fields as in the examples of tables above) that reflects the Destination-type fields and, as the case may be, the Attribute-type fields for a BGP-eVpn message, depending on the supported protocol(s) in the Mesh 232; in the example above, Layer 3 routing being supported in the Mesh 232, Destination-type fields were defined to comprise Prefix(IP), while Attribute-type fields were optionally defined to comprise Tenant(RD), Nexthop, Med and Localpref; the created database may thus associate to each entry selected Destination-type fields, and may also allow to associate to each database entry, a field representative of the time of receipt of the sent BGP-eVpn message, Timestamp field, and a field representative of the active/inactive status of the entry, Status field;

at step 502: the Deployed network monitor 233, connected to the Mesh 232, may receive a BGP-eVpn message sent over the Mesh 232;

at step 503: the Deployed network monitor 233 may parse the received BGP-eVpn message into Destination-type fields and as the case may be, Attribute-type fields;

at step 504: the Deployed network monitor 233 may query the database created at step 501;

at step 505: a comparison is made between the values in the Destination-type fields of the received BGP-eVpn message, with the values of Destination-type fields for each of any existing entries in the database; if there is no existing entry in the database with values in all the selected Destination-type fields identical to values of corresponding of the parsed Destination-type fields of the received BGP-eVpn message: adding an entry in

TABLE 2

| Status | Tenant (RD) | Timestamp | Prefix (IP) | Nexthop | Med | Localpref | AS-path |
| --- | --- | --- | --- | --- | --- | --- | --- |
| Active | T1 | 2021-08-05 09:21:34.63 | 169.254.0.0/30 | 104 | 0 | 100 | {65000} |
| Active | T2 | 2021-08-05 09:21:34.77 | 169.254.0.0/30 | 103 | 0 | 100 | {65000} |
| Active | T1 | 2021-08-05 09:21:40.18 | 10.2.1.0/24 | 104 | 0 | 100 | {65000, 65100} |
| Active | T2 | 2021-08-05 09:21:40.22 | 10.4.1.0/24 | 103 | 0 | 100 | {65000, 65200} |
| Active | T1 | 2021-08-05 09:21:40.23 | 10.1.1.0/24 | 208 | 0 | 100 | {65000} |
| Active | T1 | 2021-08-05 09:21:40.56 | 10.1.3.0/24 | 208 | 0 | 100 | {65000, 65101} |
| Active | T2 | 2021-08-05 09:21:40.79 | 10.3.1.0/24 | 207 | 0 | 100 | {65000} |
| Active | T2 | 2021-08-05 09:21:42.02 | 10.3.3.0/24 | 207 | 0 | 100 | {65000, 65102} |
| Active | T2 | 2021-08-05 09:21:44.09 | 169.254.0.0/30 | 103 | 10 | 100 | {65000} |

Figure 4:
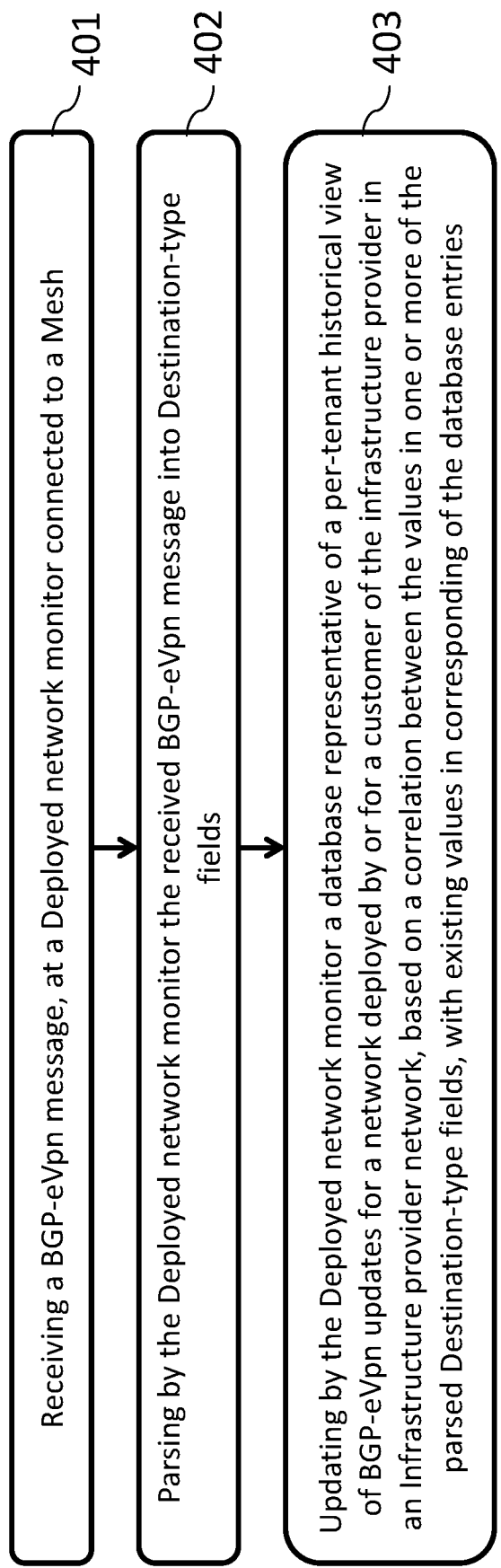
FIG. 4 presents a process according to the present technology.

As indicated, the same principles, and the present technology, including as generalized hereafter, may apply to other routing protocols, such as, without limitation, Layer 2. In the general case, the process described in relation to FIG. 4 may be applied according to the present technology:

at step 401: the Deployed network monitor 233 connected to the Mesh 232 may receive a BGP-eVpn message;

at step 402: the Deployed network monitor 233 may parse the received BGP-eVpn message into Destination-type fields; and at step 403: the Deployed network monitor 233 may update a database representative of a per-tenant historical view of BGP-eVpn updates for a network deployed the database with values in the selected Destination-type fields (optionally in the selected Attribute-type fields) set at values of corresponding of the parsed Destination-type fields (optionally respectively the parsed Attribute-type fields) of the received BGP-eVpn message, with a value representative of the time for the received BGP-eVpn message in the Timestamp field, and with an active status in the Status field; the Deployed network monitor 233 awaits the next received BGP-eVpn message; and at step 506: otherwise: adding an entry in the database with values in the selected Destination-type fields (optionally in the selected Attribute-type fields) set at values of corresponding of the parsed Destination-type fields (optionally respectively the parsed Attribute-type fields) of the received BGP-eVpn message, with a value representative of the time for the received BGP-eVpn message in the Timestamp field, and with an active status in the Status field, and editing any other existing entry in the database with values in all the selected Destination-type fields identical to values of corresponding of the parsed Destination-type fields of the received BGP-eVpn message, by setting an inactive status in the Status field; the Deployed network monitor 233 awaits the next received BGP-eVpn message.

The database created and updated by the Deployed network monitor 233 as described above, may be any kind of database still within the scope of the present technology. For example, such a database may be a database of objects, inheriting classes and properties. Such a database of objects may allow the present technology to automatically adapt to the type of received BGP-eVpn message (Update or Notification) when several types are monitored as the case may be. For example, a Notification BGP-eVpn message may be instantiated as an object of the "Notification" class. Conversely, an Update BGP-eVpn message may be instantiated as an object of the "Update" class. Both may inherit a "Message" class. These classes may then be used to optimize a database query depending on the type of surveyed BGP-eVpn message.

The database created and updated by the Deployed network monitor 233 as described above, may thus dynamically and in a consolidated manner provide both an up-to-date view of active connections, and a historical view of past events with connections, in relation to the network deployed by or for the customer in the datacenter environment of the infrastructure provider.

The infrastructure provider may provide to the customer part or all of the view afforded by the database created and updated by the Deployed network monitor 233 as described above, by providing to the customer a portion of such database's content. For example, the information provided may be partial as it relates to certain tenants only. Such provided, partial as the case may be, view and information may allow the customer to monitor and, as the case may be, debug its virtual resources in the deployed network. The complete view and information may in turn enable the infrastructure provider to both monitor and as the case may be, debug, virtual resources dedicated to the network deployed by or for the customer in the Infrastructure provider network 105.

Figure 6:
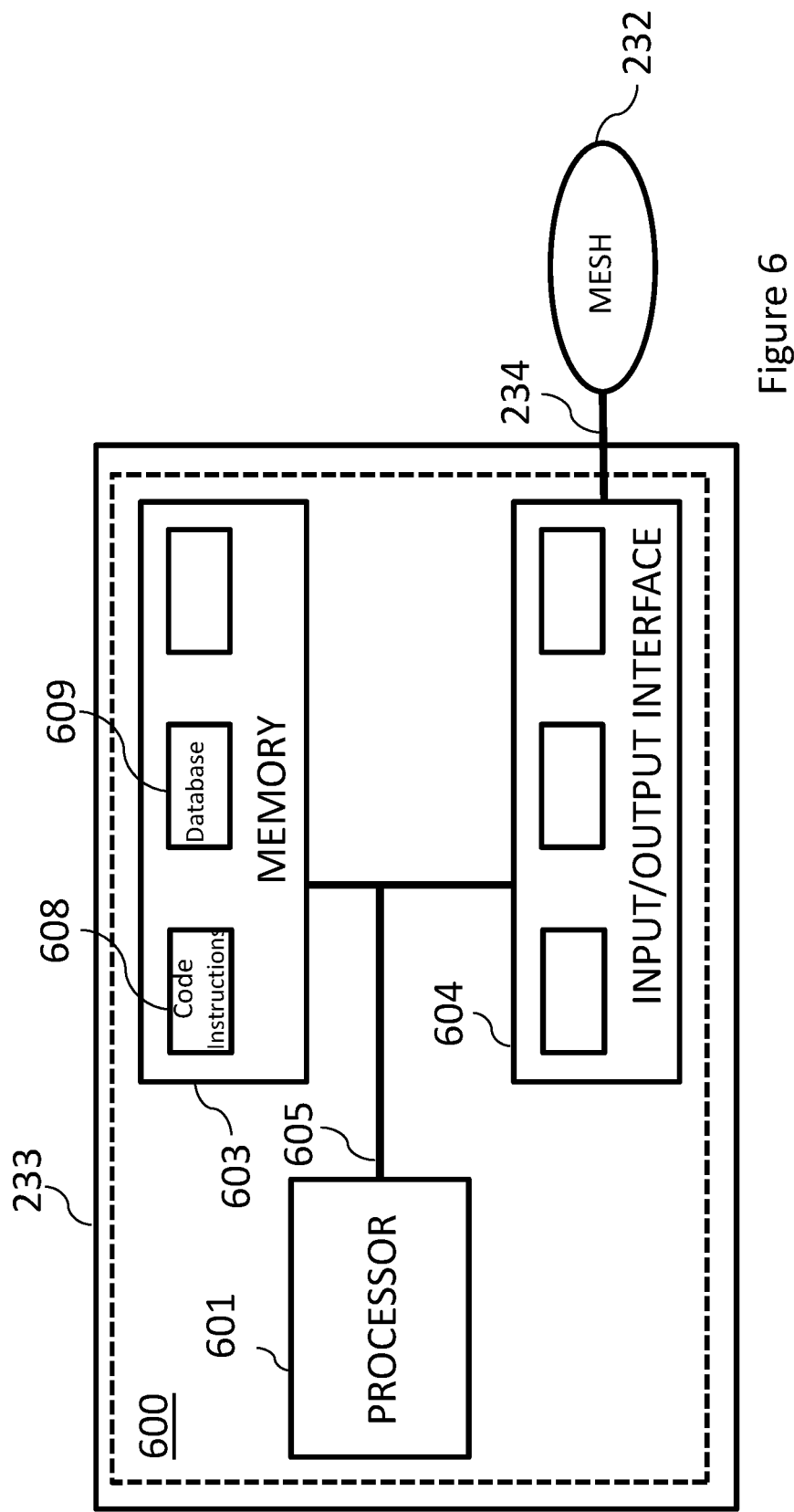
FIG. 6 illustrates a computing system that may be used in the present technology.

FIG. 6 illustrates a computing system that may be used in the present technology. An example of implementation of a Computing system 600 that may be used for the Deployed network monitor 233 is presented. As will be appreciated by the person skilled in the art, such computing system may be implemented in any other suitable hardware, software, and/or firmware, or a combination thereof, and may be a single physical entity, or several separate physical entities with a distributed functionality.

In some aspects of the present technology, the Computing system 600 may comprise various hardware components including one or more single or multi-core processors collectively represented by a Processor 601, a Memory 603 and an Input/output interface 604. In this context, the Processor 601 may or may not be included in a FPGA. In some other aspect, the Computing system 600 may be an "off the shelf" generic computing system. In some aspect, the Computing system 600 may also be distributed amongst multiple systems. The Computing system 600 may also be specifically dedicated to the implementation of the present technology. As a person in the art of the present technology may appreciate, multiple variations as to how the Computing system 600 is implemented may be envisioned without departing from the scope of the present technology.

Communication between the various components of the Computing system 600 may be enabled by one or more internal and/or external Buses 605 (e.g. a PCI bus, universal serial bus, IEEE 1394 "Firewire" bus, SCSI bus, Serial-ATA bus, ARINC bus, etc.), to which the various hardware components are electronically coupled.

The Input/output interface 604 may enable networking capabilities such as wire or wireless access. As an example, the Input/output interface 604 may comprise a networking interface such as, but not limited to, a network port, a network socket, a network interface controller and the like. Multiple examples of how the networking interface may be implemented will become apparent to the person skilled in the art of the present technology.

The Memory 603 may store Code instructions 608, such as those part of, for example, a library, an application, etc. suitable for being loaded into the Memory 603 and executed by the Processor 601 for the Deployed network monitor 233 when implementing the method and process steps according to the present technology. The Memory 603 may also store a Database 609, such as the database created and maintained by the Deployed network monitor 233 upon receipt of BGP-eVpn messages, according to the present technology. The person skilled in the art will appreciate that any of the Database 609, the Code instructions 608, and generally the Memory 603, may also physically reside outside of the Deployed network monitor 233, still within the scope of the present technology.

The Input/output interface 604 may allow the Deployed network monitor 233 to be communicably connected to the Mesh 232 through the Connection 234 (FIG. 2).

While the above-described implementations have been described and shown with reference to particular steps performed in a particular order, it will be understood that these steps may be combined, sub-divided, or re-ordered without departing from the teachings of the present disclosure. At least some of the steps may be executed in parallel or in series. Accordingly, the order and grouping of the steps is not a limitation of the present technology. It should further be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of monitoring BGP-eVpn messages sent over a Mesh between a Point of Presence, POP, and a datacenter managed by an infrastructure provider in an Infrastructure provider network, comprising:

receiving a BGP-eVpn message, at a Deployed network monitor connected to the Mesh;

parsing by the Deployed network monitor the received BGP-eVpn message into Destination-type fields;

creating a Database by associating to each entry of selected Destination-type fields, a field representative of the time of receipt of a BGP-eVpn message, Timestamp field, and a field representative of an active/inactive status of the entry, Status field; and querying, by the Deployed network monitor the Database:
  in response to no existing entry in the Database with values in all the selected Destination-type fields identical to values of corresponding of the parsed Destination-type fields of the received BGP-eVpn message:
    adding an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and
  otherwise:
    adding an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and editing any other existing entry in the Database with values in all the selected Destination-type fields identical to values of corresponding of the parsed Destination-type fields of the received BGP-eVpn message, by setting an inactive status in the Status field.

2. The method of claim 1, further comprising:
parsing by the Deployed network monitor the received BGP-eVpn message into Attribute-type fields, and
wherein:
  the creating the Database further comprises associating to each entry selected of the parsed Attribute-type fields;
  in response to no existing entry in the Database with values in all the selected Destination-type fields identical to values of corresponding of the parsed Destination-type fields of the received BGP-eVpn message: the adding an entry in the Database is further with values in the selected Attribute-type fields set at values of corresponding of the parsed Attribute-type fields of the received BGP-eVpn message; and
  otherwise: the adding an entry in the Database is further with values in the selected Attribute-type fields set at values of corresponding of the parsed Attribute-type fields of the received BGP-eVpn message.

3. The method of claim 1, wherein the Destination-type fields comprise the field IP.

4. The method of claim 1, wherein the Destination-type fields comprise the field MAC address.

5. The method of claim 2, wherein the Attribute-type fields comprise at least one of the fields AS-path, Med, Localpref, RD, or Nexthop.

6. The method of claim 1, further comprising:
using a content of the Database to infer a routing information base for a selected tenant of the network deployed by or for a customer of the infrastructure provider in the Infrastructure provider network; and
providing to the customer by the infrastructure provider the inferred routing information base for the selected tenant.

7. A system for monitoring BGP-eVpn messages sent over a Mesh between a point of presence, POP, and a datacenter managed by an infrastructure provider in an Infrastructure provider network, the system comprising a Deployed network monitor connected to the Mesh, the system being configured to:
  receive a BGP-eVpn message sent over the Mesh;
  parse the received BGP-eVpn message into Destination-type fields;
  query a Database:
    in response to no existing entry in the Database with values in all selected Destination-type fields identical to values of corresponding of the parsed Destination-type fields of the received BGP-eVpn message:
      add an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and
    otherwise:
      add an entry in the Database with values in the selected Destination-type fields set at values of corresponding of the parsed Destination-type fields of the received BGP-eVpn message, with a value representative of the time for the received BGP-eVpn message in the Timestamp field, and with an active status in the Status field, and edit any other existing entry in the Database with values in all the selected Destination-type fields identical to values of corresponding of the parsed Destination-type fields of the received BGP-eVpn message, by setting an inactive status in the Status field.

8. The system of claim 7, further configured to create the Database by further associating to each entry selected of Attribute-type fields; and wherein the Deployed network monitor is further configured to:
  parse the received BGP-eVpn message into Attribute-type fields; and
  query the Database,
  in response to no existing entry in the Database with values in all the selected Destination-type fields identical to values of corresponding of the parsed Destination-type fields of the received BGP-eVpn message:
    execute further the adding an entry in the Database with values in the selected Attribute-type fields set at values of corresponding of the parsed Attribute-type fields of the received BGP-eVpn message, and
  otherwise:
    execute further the adding an entry in the Database with values in the selected Attribute-type fields set at values of corresponding of the parsed Attribute-type fields of the received BGP-eVpn message.

9. The system of claim 7, wherein the Destination-type fields comprise the field IP.

10. The system of claim 7, wherein the Destination-type fields comprise the field MAC address.

11. The system of claim 8, wherein the Attribute-type fields comprise at least one of the fields AS-path, Med, Localpref, RD, or Nexthop.

12. The system of claim 7, further configured to:
use a content of the Database to infer a routing information base for a selected tenant of the network deployed by or for a customer of the infrastructure provider network, and provide to the customer by the infrastructure provider the inferred routing information base for the selected tenant.

13. A computer-readable medium comprising instructions causing a computing system to perform the method of claim 1.

* * * * *